United States Patent [19]

Lee

[11] Patent Number: 5,142,309

[45] Date of Patent: Aug. 25, 1992

[54] GOLF CLUB IMPACT RECORDING SYSTEM

[75] Inventor: James S. Lee, Buena Park, Calif.

[73] Assignee: Consumer Advantage Marketing Group, Inc., Sterling Heights, Mich.

[21] Appl. No.: 666,797

[22] Filed: Mar. 8, 1991

Related U.S. Application Data

[63] Continuation-in-part of Ser. No. 304,388, Jan. 30, 1989, which is a continuation-in-part of Ser. No. 204,656, Jun. 9, 1988, abandoned.

[51] Int. Cl.⁵ .............................................. A63B 69/36
[52] U.S. Cl. .................................. 346/146; 273/186.4
[58] Field of Search ................... 346/146; 273/183 A, 273/183 C, 183 D, 186

[56] References Cited

U.S. PATENT DOCUMENTS

| | | | |
|---|---|---|---|
| 2,660,436 | 11/1953 | Grossman | 273/186 D |
| 3,754,764 | 8/1973 | Manheck | 273/186 D |
| 5,033,746 | 7/1991 | Jones | 273/186 D |

Primary Examiner—Mark J. Reinhart
Attorney, Agent, or Firm—Reising, Ethington, Barnard, Perry & Milton

[57] ABSTRACT

A system is disclosed for recording the location on a golf club where the club head impacts a golf ball. A recording medium is attachable to the club head prior to swinging the golf club and is removable from the club head after one or more impacts against the golf ball. One surface of the recording medium is coated with a releasable adhesive substance to permit temporary attachment of the recording medium to the club head. A protective coating is disposed on the other surface of the recording medium for protecting the recording medium and for preventing direct contact between the recording medium and the golf ball. A backing material covers the releasable adhesive substance prior to utilization of the recording medium on the club head to prevent the recording medium from adhearing to unintended objects.

9 Claims, 1 Drawing Sheet

GOLF CLUB IMPACT RECORDING SYSTEM

This is a continuation-in-part of a prior application, U.S. Ser. No. 304,388 filed Jan. 30, 1989, which is a continuation-in-part of a prior application, Ser. No. 204,656, filed Jun. 9, 1988 now abandoned. Both prior applications were made by the same inventor and under the same title as this application.

BACKGROUND OF THE INVENTION

The present invention generally relates to an apparatus used in playing the sport of golf, and, more particularly, to a system for recording the location on the head of a golf club where the golf club impacts against a golf ball.

When playing golf, it is important to swing a golf club in a fashion which provides for maximum control over the direction and distance that the golf ball travels upon impact with the golf club. Several elements enter into a golfer's swinging technique, such as stance, grip, backswing, down-swing, pivoting of the body, shifting of body weight and location of impact of the golf club against the golf ball. The latter element is extremely important because the shape, weight and balance of the head of a golf club is not uniform throughout the area which may potentially strike a golf ball. Further, the distance of impact from the sweet spot of the head of the golf club will affect the direction in which the golf ball will travel.

In order to determine the location of impact of a golf club against a golf ball, golfers have generally relied upon observation of the flight of the golf ball after impact and upon the tactile sensation felt in the golfer's hands and forearms to generate a subjective impression. This method is extremely inaccurate and does not provide the golfer with sufficient information concerning the location of impact to allow him to adjust his swing to compensate for flaws in a previous swing.

Golfers have also examined the faces of their clubs after impact for some indication of the location of impact, such as dirt particles or grass stains which may have been transferred from the golf ball to the club face upon impact. This method is extremely unreliable since such dirt or grass markings are usually not made on golf clubs and when they are made, it is difficult to distinguish one marking from another.

Golf club impact recording systems are known in the prior art as evidenced by U.S. Pat. No. 3,754,764, issued to Manheck on Aug. 28, 1973; U.S. Pat. No. 3,806,132 issued to Brandell on Apr. 23, 1974; and U.S. Pat. No. 2,660,436 issued to Grossman on Nov. 24, 1953. These prior art systems are deficient in that they are made substantially out of paper or paper by-products and are easily torn or moved out of position under the force of impact by the club head on the golf ball. Studies have shown that the impact of a club head on a golf ball can generate a peak load of over five thousand pounds of force. This force exerted on the recording systems of the prior art is far in excess of the strength of the prior art systems, to survive multiple use. Furthermore, the paper based prior art recording systems are susceptible to damage due to moisture and can generally survive only one use, especially when wet. In summary, the short useful life and inability to maintain proper position of the golf club impact recording systems of the prior art after only one use have generally made these products unmarketable.

The subject invention overcomes the problems of the prior art in a light weight, durable, cost effective golf club impact recording system.

SUMMARY OF THE INVENTION AND ADVANTAGES

The present invention is a system for recording the location on a golf club at which the gold club impacts a golf ball. The system comprises a recording medium which is attachable to the head of a golf club and is removable from the club after impact against a golf ball. When the golf ball club bearing the recording medium strikes the golf ball, a mark is made on the recording medium which records the location of impact. This mark provides the golfer with information to adjust his swing or stance if necessary in order to properly hit the golf ball with his next swing.

The recording medium is attached to the head of a golf club with a releasable adhesive substance to facilitate removal of the recording medium from the golf club head after one or more impacts. Prior to attaching the recording medium to the club head, the recording medium is attached to a backing material to prevent the adhesive substance of a recording medium from adhering to unintended objects.

More specifically, the subject invention is directed toward a golf club impact recorder for recording the location at which the head of a golf club impacts a golf ball including a sheet of impact sensitive recording medium having first and second sides and including means for identifying the point of impact on the medium. The recorder further includes a protective coating disposed on the first side of the sheet for protecting the sheet from direct contact with the ball and/or moisture.

In an alternative embodiment, a circular aperture approximating the size of a golf ball is positioned on the recording medium to allow the golf ball to impact directly against the "sweet spot" of the club head to ensure that properly executed swings are not interfered with by the recording medium.

The recorder of the subject invention has superior survivability over the prior art and can withstand multiple impacts without tearing or being moved from its original position on the face of the golf club. The recorder of the subject invention will not break down due to moisture and can be easily removed from the golf club in one piece without leaving any residue on the club even when wet. The golf club impact recorder of the subject invention is thinner and lighter than the prior art and makes interference between the ball and golf club negligible. Furthermore, the use of the subject invention on the face of a golf club does not effect the "feel" of the club. The relatively negligible weight results in the ability of the subject invention to be used in normal play, even in wet conditions, without hindering shot making ability. The combination of the sheet of impact recording medium with the protective coating, while being thinner, produces an impact recording mark three times as vivid as marks produced with recorders of the prior art. This feature is important in that it allows the recorder of the subject invention to indicate both impact point and club head angle.

BRIEF DESCRIPTION OF THE DRAWINGS

The drawings, which constitute a part of the specification, are as follows.

DETAILED DESCRIPTION OF THE PREFERRED EMBODIMENT

Figures 1, 4:
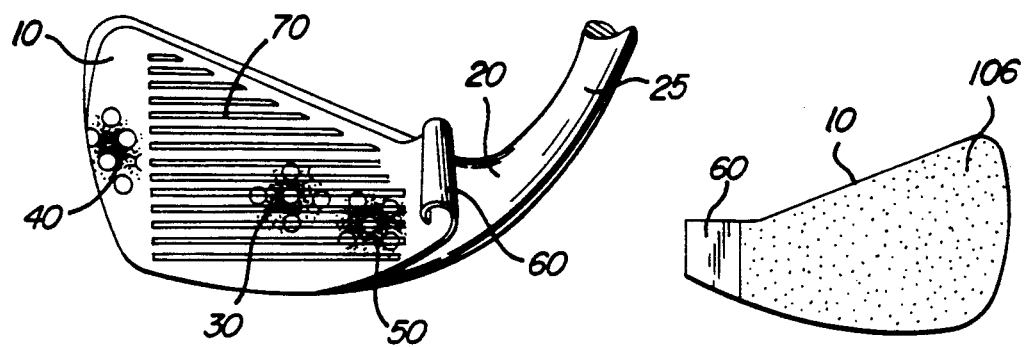
FIG. 1 is a front elevational view of a recording medium constructed according to a preferred embodiment of the present invention, as attached to the head of a golf club and bearing recordings of impacts of the club head against one or more golf balls.
FIG. 4 is a rear elevational view of the recording medium or FIGS. 1, 2, and 3.

Referring initially to FIG. 1, the recording medium 10 of the preferred embodiment of the present invention is shown as attached to, and used on, the club head 20 of a golf club 25. For purposes of illustration, the type of club known as an "iron" is depicted. However, it is to be understood that the recording medium 10 of the present invention may be applied to, and used on, both "irons" and "woods" of all shapes and sizes.

The recording medium 10 is attached to the face of the club head 20 and records the location on the club head 20 where the golf club impacts a golf ball (not shown). A mark 30 appears on the recording medium 10 when the club head 20 impacts a golf ball and further marks 40 and 50 appear on the recording medium 10 upon subsequent impacts.

The center mark 30 shown in FIG. 1 indicates that the golfer swinging the golf club hit the ball at the approximate "sweet spot" of the club head 20. That is, that golfer hit the golf ball at the approximate optimum location of the club head 20 for maximum distance and control, as determined by weight, balance and overall construction and design of the golf club 25. The center mark 30 provides the golfer with information indicating that one major element of his golf club swinging technique, that of hitting the ball at the sweet spot of the club head 20, was properly executed.

The marks to the left 40 and right 50 of the center mark 30 provide the golfer with information indicating that his golf club swinging technique was not properly executed when these marks were made on the recording medium 20. The golfer can use this information to adjust his technique in order to achieve proper execution. For example, after observing that he has hit a golf ball improperly, the golfer looks at the recording medium 10 to determine the location on the club head 20 where the golf club impacted the ball. Upon inspecting the mark 40 on the recording medium 10, he realizes that he hit the ball with the outer edge of the club head 20 and can adjust his next stance or stroke to compensate for the mis-hit. The mark 40 shows the golfer not only that he hit the ball improperly with his last stroke, but also the location and distance from the sweet spot where the club head 20 struck the ball.

The recording medium 10 may have openings 70 which provide traction to prevent the golf ball from slipping on the surface of the recording medium 10. In alternative embodiments, raised ridges or imprinted lines of a semi-adhesive substance may be used for this purpose. It is to be understood, however, that these embodiments are deemed preferred and do not constitute the only embodiments or preclude embodiments without openings, lines or ridges, such as a substantially smooth sheet of recording medium.

The recording medium 10 is attached to the club head 20 with a releasable adhesive substance (not shown) such as used with known removable labels. After one or more impacts of the golf club against a golf ball have been recorded on the recording medium 10, the golfer may remove the recording medium 10 from the club head in order to replace the used recording medium 10 with a fresh recording medium 10 or to use or store the golf club without a recording medium 10. A portion 60 of the recording medium 10 may not be provided with adhesive in order to facilitate removal of the recording medium 10 from the club head 20.

Figure 2:
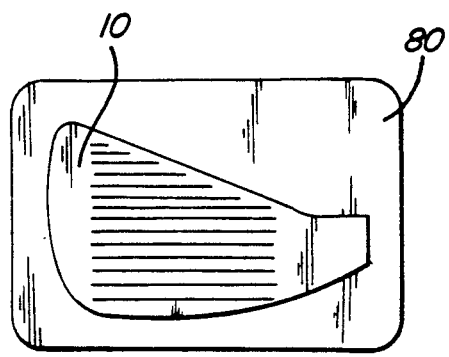
FIG. 2 is a front elevational view of the recording medium of FIG. 1, as attached to a sheet of backing material.

Referring now to FIG. 2, a unit of recording medium 10 is shown attached to a piece of backing material 80, which acts as a temporary backing prior to use of the recording medium 10 from the club head 20. The backing material 80 prevents the recording medium 10 from adhering to unintended objects and permits it to be removed easily from the backing material 80 when use on the club head 20 is desired.

Figure 3:
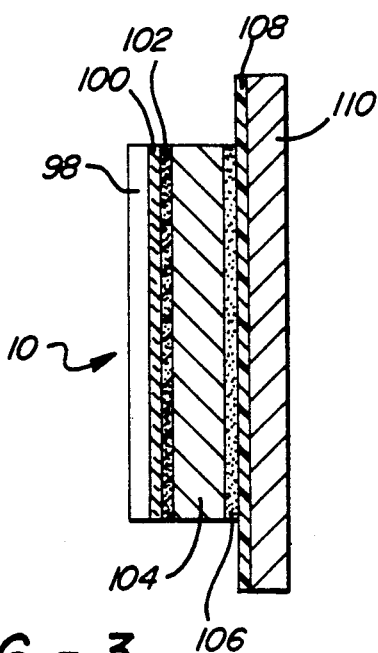
FIG. 3 is a representational cross-sectional side view of the recording medium and backing material of FIG. 2.

FIG. 3 is a representational cross-sectional view of one embodiment of the recording medium 10 attached to the backing material 80. The dimensions of FIG. 3 are illustrative only and do not represent accurate proportional measurements. The recording medium 10 is shown as a composite of four layers comprising a layer of protective coating 98, such as wax or polyethylene; a layer of dye co-reactants 100; a layer of dye capsules 102; and a layer of fibrous paper 104.

In operation, an impact of a golf ball against the recording medium 10 causes dye capsules 102 to be crushed, further causing dye contained in the capsules to come into contact with dye co-reactants 100. A resulting chemical reaction causes the dye to change color at the location of impact and creates a visible mark on the paper 104. The protective coating 98 shields the other layers 100, 102 and 104 from moisture and also prevents cracking or tearing of the paper layer to provide added durability. The combination of inexpensive materials, such as polyethylene and paper, for layers 98 and 104 of the recording medium 10 provides a significant economic advantage over the recording systems of the prior art.

A layer of an adhesive substance 106, preferably a releasable adhesive substance such as used on known removable labels, is applied to the surface of the layer of paper 104 opposite the dye co-reactant 100 and dye capsule 102 layers. The adhesive substance 106 is permanently bonded to the layer of paper 104 so that it remains bonded to the paper 104 upon removal of the recording medium 10 from the backing material 80, which may be waxed paper, and subsequently, upon removal of the recording medium 10 from the club head 20. However, the adhesive substance 106 does not become permanently bonded to either the backing material 80 or the club head 20 when the recording medium 10 is attached to these articles, thus allowing easy removal of the recording medium 10 from the backing material 80 and the club head 20.

The backing material 80 is shown as a composite of two layers comprising a layer of wax 108 and a layer of fibrous paper 110. The layer of wax 108 provides a relatively smooth and non-porous surface upon which to attach the recording medium 10 without creating a permanent bond between the recording medium 10 and the backing material 80. That is, the wax layer 108 prevents the adhesive layer 106 from adhering to the layer of fibrous paper 110 of the backing material 80. In operation, the recording medium 10 is attached to the backing material 80 by adhering the adhesive layer 106 of the recording medium 10 to the wax layer 108 of the backing material 80 for temporary protection of the adhesive layer 106. When use of the recording medium 10 on the club head 20 is desired, the recording medium 10 is removed from the backing material 80 and attached to the club head 20, as shown in FIG. 1. The backing material 80 may then be discarded. It is to be understood that other embodiments of backing material, including but not limited to silicone paper or a single layer of synthetic film, are possible without departing from the scope of the present invention.

In order to facilitate easy removal of the recording medium 10 from the backing material 80 and the club head 20, the adhesive substance 106 is preferably applied to less than the entire surface of the recording medium 10, as shown in FIG. 4. That is, on the surface of the recording medium opposite the layers of dye coreactants 100 and dye capsules 102, a portion 60 of the recording medium 10 is not covered with the adhesive substance 106 in order to ensure that this portion 60 of the recording medium 10 does not adhere to the backing material 80 or club head 20 and to provide a tab which may be pulled to initiate removal of the recording medium 10 from the backing material 80 and club head 20. In an alternative embodiment, the adhesive substance 106 is applied to one entire surface of the recording medium 10 and a backing material (not shown) is attached to a portion of the surface of the recording medium 10 to which the adhesive substance 106 is applied.

Figure 5:
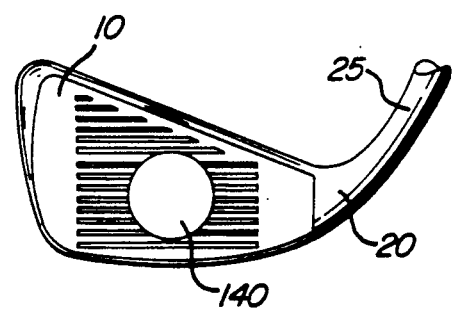
FIG. 5 is a front elevational view of a recording medium constructed according to an alternative embodiment of the present invention and attached to the head of a golf club.

Referring now to FIG. 5, an alternative embodiment of the recording medium 10 is shown. A circular aperture 140 approximating the size of a golf ball is positioned on the recording medium at the approximate location of the sweet spot of the club head 20 to which the recording medium 10 is attached. This aperture 140 allows the golf ball to impact directly against the club head 20 whenever the golfer hits the ball with the sweet spot of the club head 20. Slippage of the ball or other interference which may be caused by hitting the recording medium 10 is thereby avoided, ensuring that the recording medium 10 does not interfere with properly executed swings. Additionally, the useful life of the recording medium 10 is prolonged with this embodiment since only an improperly executed swing of a golf club will cause the recording medium 10 to impact against the ball. When the golfer properly executes a swing, the ball will not impact against the recording medium 10 and there will be no degeneration or damage to the recording medium 10 caused by that swing.

Figure 6:
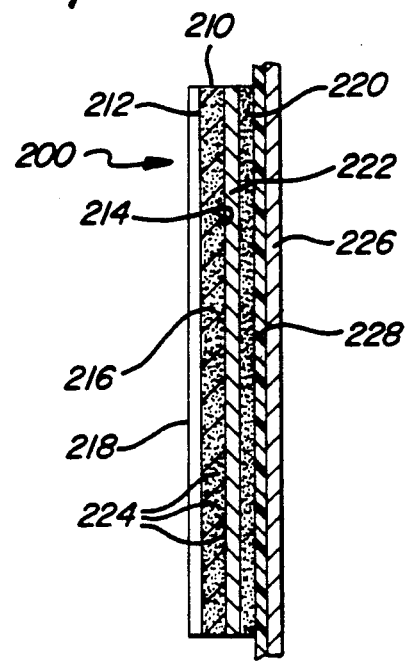
FIG. 6 is a representational cross-sectional side view of another embodiment of the subject invention.

An alternative embodiment of the golf club impact recorder of the subject invention is generally shown at 200 in FIG. 6. The impact recorder 200 includes a sheet of impact sensitive recording medium 210 having first and second sides, 212, 214, respectively and includes means 216 for identifying the point of impact on the medium 210. The recorder 200 further includes a protective coating 218 disposed on the first side 212 of the sheet 210 for protecting the sheet 210 from direct contact with the golf ball. The protective coating includes a layer of plastic 218 disposed on the first side 212 of the sheet 210. The layer of plastic is made of polyethylene and is laminated to the sheet of impact sensitive recording medium 210.

An adhesive coating 220 is disposed on the second side 214 of the sheet of recording medium 210. A primer coating 222 is disposed on the second side 214 of the sheet of recording medium 210 and between the sheet and the adhesive 220. The primer 222 bonds the adhesive 220 to the second side 214 of the sheet 210 such that the sheet 210 may be removed from a backing material 226 and applied to the face of the golf club while retaining the adhesive coating 220 on the sheet 210. The adhesive coating 220 of the preferred embodiment is a solvent synthetic rubber based removable adhesive and the primer coating 222 used in conjunction with this adhesive is a solvent, silica type of primer, both of which are commonly known in the art.

The means 216 for identifying the point of impact of a golf ball on the face of a golf club includes a plurality of die capsules 224 disposed within the sheet 210. The die capsules 224 rupture upon impact with the ball and leave an impression on the sheet 210 to locate the point of impact of the ball on the head of golf club. More specifically, the sheet of impact sensitive recording medium 210 is an ink impregnated kraft paper which includes the die capsules 224.

Prior to its application to the head of golf clubs, the sheet of impact sensitive recording medium 210 is releasably adhesively mounted on its second side 214 to a backing material 226. A silicone coating 228 is disposed on the backing 226 and between the backing 226 and the adhesive coating 220 of the sheet 210 so that the sheet 210 may be easily removed from the backing 226 without destroying or degrading the adhesive coating 220 on the sheet 210. The backing material 226 is made of a kraft paper and is a 42 lb/ream, super calendared, bleached kraft paper of the type which is commonly used for backing materials on adhesively backed labels.

The polyethylene plastic protective coating 218 which is laminated to the ink impregnated kraft paper 210, the primer 222 and adhesive 220 applied to the kraft paper 210, as well as the silicone coated backing paper 226 are all available from Avery Dennison Corporation 1616 South California Monrovia, Calif. 91016.

When in use, the golf club impact recorder 200 of the subject invention is removed from the backing material 226 and attached to the head of a golf club as was discussed previously above and as shown in FIG. 1. The backing material 226 may then be discarded. The golf club recorder 200 may then be used during a number of impact resulting swings to record the location of the impact of the golf club head with the golf ball without the resulting tearing and slipping associated with the recorders of the prior art.

The foregoing description of the preferred embodiments are illustrative of the best modes presently contemplated by the inventor for embodying the present invention. It is to be understood, however, that other embodiments are possible without departing from the scope and spirit of the present invention.

What I claim is:

1. A golf club impact recorder for recording the location at which the head of a golf club impacts a golf ball, said apparatus comprising:

a sheet of impact sensitive recording medium having first and second sides and including means for identifying the point of impact on said medium; and a protective coating disposed on said first side of said sheet for protecting said sheet and for preventing direct contact between said sheet and the golf ball.

2. An apparatus as set forth in claim 1 further characterized by said protective coating including a layer of plastic disposed on said first side of said sheet.

3. An apparatus as set forth in claim 2 further characterized by including an adhesive disposed on said second side of said sheet of recording medium.

4. An apparatus as set forth in claim 3 further characterized by said means for identifying the point of impact including a plurality of die capsules disposed within said sheet, said die capsules rupturing upon impact with the ball and leaving an impression on said sheet to locate the point of impact of the ball on the head of a golf club.

5. An apparatus as set forth in claim 4 further characterized by said sheet of impact sensitive recording medium including an ink impregnated kraft paper.

6. An apparatus as set forth in claim 5 further characterized by including a primer coating disposed on said second side of said sheet of recording medium and between said sheet of said recording medium and said adhesive.

7. An apparatus as set forth in claim 6 further characterized by said sheet of impact sensitive recording medium releasably adhesively mounted to a backing material on said second side of said sheet of impact sensitive recording medium.

8. An apparatus as set forth in claim 7 further characterized by including a silicone coating disposed on said backing and between said backing and said adhesive coating disposed and said second side of said sheet of impact sensitive recording medium.

9. An apparatus as set forth in claim 8 further characterized by said layer of plastic being made of polyethylene.

* * * * *